(12) United States Patent
Hirose et al.

(10) Patent No.: US 9,126,303 B2
(45) Date of Patent: *Sep. 8, 2015

(54) METHOD FOR PRODUCTION OF A LAMINATE POLISHING PAD

(75) Inventors: Junji Hirose, Osaka (JP); Masato Doura, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 1861 days.

This patent is subject to a terminal disclaimer.

(21) Appl. No.: 12/065,253

(22) PCT Filed: Aug. 25, 2006

(86) PCT No.: PCT/JP2006/316699
§ 371 (c)(1),
(2), (4) Date: Jul. 3, 2008

(87) PCT Pub. No.: WO2007/026610
PCT Pub. Date: Mar. 8, 2007

(65) Prior Publication Data
US 2008/0305720 A1   Dec. 11, 2008

(30) Foreign Application Priority Data

Aug. 30, 2005 (JP) .................................. 2005-249056

(51) Int. Cl.
*B24B 37/20* (2012.01)
*B24D 18/00* (2006.01)
(Continued)

(52) U.S. Cl.
CPC ................ *B24B 37/20* (2013.01); *B24D 18/00* (2013.01); *B29C 44/32* (2013.01); *C08G 18/12* (2013.01);
(Continued)

(58) Field of Classification Search
CPC .. B24B 37/20; C08G 18/4854; C08G 18/758; C08G 18/7621; C08G 18/12; C08G 18/724; C08G 2101/0025; B29C 44/32; B24D 18/00

USPC .......................................................... 51/293
See application file for complete search history.

(56) References Cited

U.S. PATENT DOCUMENTS 3,049,463 A  8/1962 Kallander et al.
3,284,274 A  11/1966 Hulslander et al.
(Continued)

FOREIGN PATENT DOCUMENTS

CN  1407606  4/2003
CN  1586002  2/2005
(Continued)

OTHER PUBLICATIONS

International Preliminary Report on Patentability mailed Nov. 28, 2006, directed at counterpart PCT application No. PCT/JP2006/316699; 11 pages.
(Continued)

*Primary Examiner* — Shuangyi Abu Ali
(74) *Attorney, Agent, or Firm* — Morrison & Foerster LLP

(57) ABSTRACT

Disclosed is a method for production of a laminate polishing pad which comprises a reduced number of steps and is excellent in productivity rate, and which causes no detachment between a polishing layer and a cushion layer and can prevent the groove clogging caused by a slurry or the like. Also disclosed is a laminate polishing pad produced by the method. A method for production of a laminate polishing pad, comprising the steps of: preparing a cell-dispersed urethane composition by a mechanical frothing process; ejecting the cell-dispersed urethane composition onto a cushion layer continuously while feeding the cushion layer; curing the cell-dispersed urethane composition while controlling the thickness of the composition evenly to form a polishing layer made of a polyurethane foam, thereby producing a long laminate sheet; and cutting the long laminate sheet.

5 Claims, 6 Drawing Sheets

(51) Int. Cl.
*B29C 44/32* (2006.01)
*C08G 18/12* (2006.01)
*C08G 18/48* (2006.01)
*C08G 18/72* (2006.01)
*C08G 18/75* (2006.01)
*C08G 18/76* (2006.01)
*C08G 101/00* (2006.01)

(52) U.S. Cl.
CPC .......... *C08G 18/4854* (2013.01); *C08G 18/724* (2013.01); *C08G 18/758* (2013.01); *C08G 18/7621* (2013.01); *C08G 2101/0025* (2013.01)

(56) References Cited

U.S. PATENT DOCUMENTS

| | | |
|---|---|---|
| 4,216,177 A | 8/1980 | Otto |
| 4,762,902 A | 8/1988 | Murphy |
| 5,409,770 A | 4/1995 | Netsu et al. |
| 5,607,982 A | 3/1997 | Heyman et al. |
| 6,046,295 A | 4/2000 | Frisch, Jr. et al. |
| 6,099,954 A | 8/2000 | Urbanavage et al. |
| 6,107,355 A | 8/2000 | Horn et al. |
| 6,420,448 B1 | 7/2002 | Hnatow et al. |
| 6,428,586 B1 * | 8/2002 | Yancey ............... 51/297 |
| 6,561,889 B1 | 5/2003 | Xu et al. |
| 6,572,463 B1 | 6/2003 | Xu et al. |
| 6,656,019 B1 * | 12/2003 | Chen et al. ............ 451/41 |
| 6,803,495 B2 | 10/2004 | Simpson |
| 7,074,115 B2 | 7/2006 | James et al. |
| 7,261,625 B2 | 8/2007 | Hishiki |
| 7,291,063 B2 | 11/2007 | Swisher et al. |
| 7,378,454 B2 | 5/2008 | Masui et al. |
| 7,414,080 B2 | 8/2008 | Kulp |
| 7,731,568 B2 | 6/2010 | Shimomura et al. |
| 7,762,870 B2 | 7/2010 | Ono et al. |
| 7,874,894 B2 | 1/2011 | Fukuda et al. |
| 7,927,183 B2 | 4/2011 | Fukuda et al. |
| 7,927,452 B2 | 4/2011 | Hirose et al. |
| 8,094,456 B2 | 1/2012 | Fukuda et al. |
| 8,148,441 B2 | 4/2012 | Doura et al. |
| 8,167,690 B2 | 5/2012 | Fukuda et al. |
| 8,398,794 B2 * | 3/2013 | Fukuda et al. ........... 156/78 |
| 2002/0183409 A1 | 12/2002 | Seyanagi et al. |
| 2003/0032378 A1 | 2/2003 | Ichimura et al. |
| 2003/0109209 A1 | 6/2003 | Hishiki |
| 2003/0119425 A1 * | 6/2003 | Suzuki ............... 451/41 |
| 2003/0194963 A1 | 10/2003 | Xu et al. |
| 2004/0024719 A1 | 2/2004 | Adar et al. |
| 2004/0142641 A1 | 7/2004 | Ohno et al. |
| 2004/0157985 A1 | 8/2004 | Masui et al. |
| 2004/0166790 A1 | 8/2004 | Balijepalli et al. |
| 2005/0064709 A1 | 3/2005 | Shimomura et al. |
| 2005/0079806 A1 | 4/2005 | James et al. |
| 2005/0112354 A1 | 5/2005 | Kume et al. |
| 2005/0171224 A1 | 8/2005 | Kulp |
| 2005/0171225 A1 | 8/2005 | Kulp |
| 2005/0222288 A1 | 10/2005 | Seyanagi et al. |
| 2006/0022368 A1 | 2/2006 | Lee et al. |
| 2006/0280929 A1 | 12/2006 | Shimomura et al. |
| 2006/0280930 A1 | 12/2006 | Shimomura et al. |
| 2007/0275226 A1 | 11/2007 | Kulp |
| 2008/0153395 A1 | 6/2008 | Kulp et al. |
| 2008/0182492 A1 | 7/2008 | Crkvenac et al. |
| 2008/0269369 A1 | 10/2008 | van Heuman et al. |
| 2009/0011221 A1 | 1/2009 | Kawaguchi et al. |
| 2009/0047872 A1 | 2/2009 | Fukuda et al. |
| 2009/0093202 A1 | 4/2009 | Fukuda et al. |
| 2009/0137188 A1 | 5/2009 | Fukuda et al. |
| 2009/0137189 A1 | 5/2009 | Fukuda et al. |
| 2009/0148687 A1 | 6/2009 | Hirose et al. |
| 2009/0253353 A1 | 10/2009 | Ogawa et al. |
| 2010/0003896 A1 | 1/2010 | Nakai et al. |
| 2010/0009611 A1 | 1/2010 | Fukuda et al. |
| 2010/0029182 A1 | 2/2010 | Fukuda et al. |
| 2010/0029185 A1 | 2/2010 | Fukuda et al. |
| 2010/0048102 A1 | 2/2010 | Nakai et al. |
| 2010/0120249 A1 | 5/2010 | Hirose et al. |
| 2010/0162631 A1 | 7/2010 | Sato et al. |
| 2010/0221984 A1 | 9/2010 | Doura et al. |
| 2010/0317263 A1 | 12/2010 | Hirose et al. |
| 2011/0151240 A1 | 6/2011 | Hirose et al. |
| 2011/0256817 A1 | 10/2011 | Fukuda et al. |
| 2012/0108065 A1 | 5/2012 | Fukuda et al. |
| 2012/0108149 A1 | 5/2012 | Fukuda et al. |

FOREIGN PATENT DOCUMENTS

| | | | |
|---|---|---|---|
| CN | 1602321 | 3/2005 | |
| CN | 1625575 | 6/2005 | |
| JP | 60-42431 | 3/1985 | |
| JP | 61-187657 U | 11/1986 | |
| JP | 2-100321 | 4/1990 | |
| JP | 4-159084 | 6/1992 | |
| JP | 4-202215 | 7/1992 | |
| JP | 5-329852 | 12/1993 | |
| JP | 6-23664 | 2/1994 | |
| JP | 6-262633 | 9/1994 | |
| JP | 10-329005 A | 12/1998 | |
| JP | 11-207758 | 8/1999 | |
| JP | 2000-246620 | 9/2000 | |
| JP | 2001-62703 | 3/2001 | |
| JP | 2002-60452 | 2/2002 | |
| JP | 2002-217149 | 8/2002 | |
| JP | 2002-226608 | 8/2002 | |
| JP | 2002-264912 | 9/2002 | |
| JP | 2002-307293 | 10/2002 | |
| JP | 2002-355754 | 12/2002 | |
| JP | 2003-37089 | 2/2003 | |
| JP | 2003-053657 A | 2/2003 | |
| JP | 2003-100681 | 4/2003 | |
| JP | 2003-209079 | 7/2003 | |
| JP | 2003-218074 A | 7/2003 | |
| JP | 2003-220550 A | 8/2003 | |
| JP | 2003-304951 | 10/2003 | |
| JP | 2004-2788 | 1/2004 | |
| JP | 2004-025407 A | 1/2004 | |
| JP | 3490431 | 1/2004 | |
| JP | 2004-042189 A | 2/2004 | |
| JP | 2004-42244 A | 2/2004 | |
| JP | 2004-87647 | 3/2004 | |
| JP | 2004-119657 | 4/2004 | |
| JP | 2004-169038 A | 6/2004 | |
| JP | 2004-188716 | 7/2004 | |
| JP | 2004-193390 | * 7/2004 | ............ H01L 21/304 |
| JP | 2004-524676 A | 8/2004 | |
| JP | 2004-291155 | 10/2004 | |
| JP | 2004-335713 | 11/2004 | |
| JP | 2004-337992 | 12/2004 | |
| JP | 2005-1083 A | 1/2005 | |
| JP | 2005-34971 | 2/2005 | |
| JP | 2005-68175 | 3/2005 | |
| JP | 2005-131720 | 5/2005 | |
| JP | 2005-153053 | 6/2005 | |
| JP | 2005-330621 | 12/2005 | |
| JP | 2006-502300 | 1/2006 | |
| JP | 2006-35367 | 2/2006 | |
| JP | 2006-75914 | 3/2006 | |
| JP | 2006-222349 | 8/2006 | |
| JP | 2006-519115 | 8/2006 | |
| JP | 2006-231429 | 9/2006 | |
| JP | 2006-255828 | 9/2006 | |
| JP | 2006-265303 | 10/2006 | |
| JP | 2006-297515 | 11/2006 | |
| JP | 2006-334745 | 12/2006 | |
| JP | 2006-339570 | 12/2006 | |
| JP | 2006-342191 | 12/2006 | |
| JP | 2007-112032 | 5/2007 | |
| JP | 2007-283712 | 11/2007 | |
| JP | 2007-307700 | 11/2007 | |
| JP | 2008-31034 | 2/2008 | |
| JP | 2008-156519 | 7/2008 | |
| TW | I222390 | 10/2004 | |
| TW | 200806431 | 2/2008 | |

(56) References Cited

FOREIGN PATENT DOCUMENTS

| WO | WO-01/96434 | 12/2001 |
|---|---|---|
| WO | WO-02/051587 A1 | 7/2002 |
| WO | WO-03/043071 A1 | 5/2003 |
| WO | WO-2004/054779 | 7/2004 |
| WO | WO-2005/055693 | 6/2005 |
| WO | WO-2007/010766 | 1/2007 |
| WO | WO-2007/123168 | 11/2007 |
| WO | WO-2008/026451 | 3/2008 |

OTHER PUBLICATIONS

Japanese Notification of Reasons for Refusal mailed Aug. 2, 2011, directed to counterpart Japanese Application No. 2005-249056; 4 pages.
International Search Report dated Nov. 28, 2006, directed to counterpart Application No. PCT/JP2006/316699 (4 pages).
Decision of the Reexamination dated Mar. 25, 2013, directed to Chinese Application No. 200780033122.9; 26 pages.
Office Action dated Jan. 14, 2013, directed to Taiwanese Application No. 098106388; 7 pages.
Fukuda et al., U.S. Office Action dated Mar. 13, 2013, directed to U.S. Appl. No. 12/439,992; 11 pages.
Office Action mailed Dec. 18, 2009, directed to Chinese Application No. 2006800259433; 11 pages.
Office Action mailed Apr. 22, 2010, directed to Chinese Application No. 200780033122.9; 13 pages.
Decision on Rejection dated Apr. 15, 2011, directed to Chinese Application No. 200780033122.9; 16 pages.
Notice of Reexamination dated Oct. 12, 2012, directed to Chinese Application No. 200780033122.9; 15 pages.
Notification of First Office Action dated Dec. 19, 2011, directed to Chinese Application No. 200910178369.0; 21 pages.
Notification of First Office Action dated Mar. 28, 2012, directed to Chinese Application No. 201110049758.0; 13 pages.
Notification of the Second Office Action dated Oct. 12, 2012, directed to Chinese Application No. 201110049758.0; 10 pages.
Notification of First Office Action dated May 2, 2012, directed to Chinese Application No. 200910178370.3; 8 pages.
International Search Report mailed on Sep. 26, 2006, directed to International Application No. PCT/JP2006/313597; 5 pages.
International Search Report mailed Jun. 5, 2007, directed to International Application No. PCT/JP2007/058757; 1 page.
International Search Report mailed Jun. 5, 2007, directed to International Application No. PCT/JP2007/058758; 1 page.
International Search Report mailed Mar. 11, 2008, directed to International Application No. PCT/JP2007/072852; 4 pages.
International Search Report mailed Jun. 2, 2009, directed to International Application No. PCT/JP2009/053481; 3 pages.
Office Action mailed Jan. 22, 2008, directed to Japanese Application No. 2007-227773; 3 pages.
Office Action mailed Jan. 22, 2008, directed to Japanese Application No. 2007-112032; 3 pages.
Notification of Reasons for Refusal mailed Jul. 22, 2010, directed to Japanese Application No. 2008-063034; 6 pages.
Notification of Reasons for Refusal mailed Apr. 8, 2011 directed to Japanese Application No. 2006-072873; 6 pages.
Notification of Reasons for Refusal mailed Apr. 8, 2011 directed to Japanese Application No. 2006-072945; 6 pages.
Notification of Reasons for Refusal mailed Apr. 8, 2011 directed to Japanese Application No. 2006-072957; 6 pages.
Notification of Reasons for Refusal mailed Jan. 10, 2012, directed to Japanese Application No. 2007-006229; 6 pages.
Notification of Reasons for Refusal mailed Feb. 2, 2012, directed to Japanese Application No. 2007-006224; 6 pages.
Notice to Submit a Response dated Mar. 30, 2011, directed to Korean Application No. 10-2009-7004682; 6 pages.
Office Action dated Mar. 30, 2011, directed to Korean Application No. 10-2009-7004683; 7 pages.
Substantive Examination Adverse Report dated Dec. 15, 2011, directed to Malaysian Application No. PI 20080065; 3 pages.
Office Action dated Aug. 19, 2009, directed to Taiwanese Application No. 096114785; 9 pages.
Office Action dated Oct. 26, 2010, directed to Taiwanese Application No. 096114786; 6 pages.
Office Action mailed Sep. 7, 2011, directed to Taiwanese Application No. 096146036; 14 pages.
Office Action dated Aug. 30, 2012, directed to Taiwanese Application No. 098106388; 8 pages.
Hirose, U.S. Office Action mailed May 4, 2010, directed to U.S. Appl. No. 11/995,311; 9 pages.
Hirose et al., U.S. Office Action mailed Sep. 26, 2011, directed to U.S. Appl. No. 13/038,849; 11 pages.
Hirose et al., U.S. Office Action mailed Feb. 7, 2012, directed to U.S. Appl. No. 13/038,849; 11 pages.
Fukuda et al., U.S. Office Action mailed Nov. 8, 2011, directed to U.S. Appl. No. 12/439,992; 11 pages.
Fukuda et al., U.S. Office Action dated Apr. 26, 2012, directed to U.S. Appl. No. 12/439,992; 11 pages.
Fukuda et al., U.S. Office Action dated Oct. 4, 2012, directed to U.S. Appl. No. 12/439,992; 9 pages.
Fukuda et al., U.S. Office Action mailed Jun. 2, 2011, directed to U.S. Appl. No. 12/440,003; 7 pages.
Fukuda et al., U.S. Office Action mailed Nov. 16, 2011 directed to U.S. Appl. No. 12/519,339; 8 pages.
Hirose et al., U.S. Office Action mailed Aug. 20, 2012, directed to U.S. Appl. No. 12/864,819; 14 pages.
Decision of Rejection dated Mar. 1, 2013, directed to CN Application No. 200910178370.3; 8 pages.

* cited by examiner

METHOD FOR PRODUCTION OF A LAMINATE POLISHING PAD

TECHNICAL FIELD

The present invention relates to a method for production of a laminate polishing pad by which the planarizing processing of optical materials such as lenses, reflecting mirrors and the like, silicon wafers, glass substrates for hard disks, aluminum substrates, and materials requiring a high degree of surface planarity such as those in general metal polishing processing can be carried out stably with high polishing efficiency. The laminate polishing pad obtained by the manufacturing method of the present invention is used particularly preferably in a process of planarizing a silicone wafer, and a device having an oxide layer, a metal layer or the like formed on a silicon wafer, before lamination and formation of the oxide layer, the metal layer or the like.

BACKGROUND ART

Production of a semiconductor device involves a step of forming an electroconductive film on the surface of a wafer to form a wiring layer by photolithography, etching etc., a step of forming an interlaminar insulating film on the wiring layer, etc., and an uneven surface made of an electroconductive material such as metal and an insulating material is generated on the surface of a wafer by these steps. In recent years, processing for fine wiring and multilayer wiring is advancing for the purpose of higher integration of semiconductor integrated circuits, and accordingly techniques of planarizing an uneven surface of a wafer have become important.

As the method of planarizing an uneven surface of a wafer, a CMP method is generally used. CMP is a technique wherein while the surface of a wafer to be polished is pressed against a polishing surface of a polishing pad, the surface of the wafer is polished with an abrasive in the form of slurry having abrasive grains dispersed therein (hereinafter, referred to as slurry). As shown in FIG. 1, a polishing apparatus used generally in CMP is provided for example with a polishing platen 2 for supporting a polishing pad 1, a supporting stand (polishing head) 5 for supporting a polished material (wafer) 4, a backing material for uniformly pressurizing a wafer, and a mechanism of feeding an abrasive. The polishing pad 1 is fitted with the polishing platen 2 for example via a double-sided tape. The polishing platen 2 and the supporting stand 5 are provided with rotating shafts 6 and 7 respectively and are arranged such that the polishing pad 1 and the polished material 4, both of which are supported by them, are opposed to each other. The supporting stand 5 is provided with a pressurizing mechanism for pushing the polished material 4 against the polishing pad 1.

Conventionally, such polishing pads are produced by batch methods such as (1) a method including pouring a resin material into a mold to form a resin block and slicing the resin block with a slicer; (2) a method including pouring a resin material into a mold and pressing the resin material into a thin sheet form; and (3) a method including melting a resin material as a raw material and directly extruding the resin material from a T die into a sheet form. For example, Patent Document 1 discloses that polishing pads are produced by reaction injection molding.

Laminate polishing pads are produced by laminating, with an adhesive or double-side tape, a plurality of resin sheets, such as a polishing layer and a cushion layer, obtained by the method described above, and such a method for production of laminate polishing pads has the problems of a large number of production steps and low productivity rate. Patent Document 2 discloses that in order to solve the problems, laminate polishing pads are produced using an extruder.

A method for continuous production of a polyurethane/polyurea polishing sheet is proposed in order to prevent variations in hardness, gas cell size or the like, which would be caused by batch production methods (see Patent Document 3). Specifically, the method includes mixing a polyurethane material, a fine powder with a particle size of 300 μm or less and an organic foaming agent, ejecting the mixture between a pair of endless plane belts and casting the mixture, then subjecting the mixture to a polymerization reaction with heating means, and separating the resulting sheet-like product from the plane belts to obtain a polishing sheet material.

The polishing surface of polishing pads to be in contact with a substance to be polished is generally provided with grooves for holding and replacing a slurry. The polishing surface of polishing pads made of a foam has a large number of openings and thus has the function of holding and replacing a slurry. The polishing surface provided with grooves allows more efficient holding and replacing of a slurry and can prevent destruction of the polished substance, which is caused by adsorption on the polished substance.

As conventional polishing pads for use in high-precision polishing, polyurethane foam sheets are generally used. Polyurethane foam sheets are excellent in locally planarizing performance but have insufficient cushion performance, and therefore it is difficult to evenly apply a pressure to the entire surface of a wafer from such a polyurethane foam sheet. Thus, another soft cushion layer is generally provided on the back side of such a polyurethane foam sheet to form a laminate polishing pad for use in polishing processes. For example, the laminate polishing pads described below have been developed.

There is disclosed a polishing pad including: a laminate of a first relatively-hard layer and a second relatively-soft layer; and grooves with a certain pitch or projections with a certain form on the polishing surface of the first layer (see Patent Document 4).

It is also disclosed a polishing fabric including: a first sheet-like member having elasticity and irregularities on its surface; and a second sheet-like member that is provided on the surface of the first sheet-like member having irregularities and has a surface for facing the polished surface of an substrate to be treated (see Patent Document 5).

There is also disclosed a polishing pad including a polishing layer and a supporting layer that is laminated on one side of the polishing layer and made of a foam having a compression ratio higher than that of the polishing layer (see Patent Document 6).

However, the conventional laminate polishing pads have a problem in which since they are produced by bonding the polishing layer to the cushion layer with a double-side tape (a pressure-sensitive adhesive layer), a slurry can intrude between the polishing layer and the cushion layer during polishing to reduce the adhesion of the double-side tape so that the polishing layer can be detached from the cushion layer. When the surface of such laminate polishing pads are provided with grooves, there is also a problem in which abrasive grains in a slurry, polishing dust and the like tend to stay in the grooves to cause groove clogging so that the polishing speed can be reduced or made unstable and the planarity or in-plane uniformity of the polished substance can be reduced.

Patent Document 1: Japanese Patent Application Laid-Open (JP-A) No. 2004-42189

Patent Document 2: JP-A No. 2003-220550

Patent Document 3; JP-A No. 2004-169038
Patent Document 4; JP-A No. 2003-53657
Patent Document 5; JP-A No. 10-329005
Patent Document 6: JP-A No. 2004-25407

DISCLOSURE OF THE INVENTION

Problems to be Solved by the Invention

It is an object of the invention to provide a method for production of a laminate polishing pad which includes a reduced number of production steps and is excellent in productivity rate. It is another object of the invention to provide a method for production of a laminate polishing pad which causes no detachment between a polishing layer and a cushion layer and can prevent the groove clogging caused by a slurry or the like and to provide a laminate polishing pad produced by such a method. It is a further object of the invention to provide a method for production of a semiconductor device with such a laminate polishing pad.

Means for Solving the Problems

As a result of investigations for solving the problems described above, the inventors have found that the objects can be achieved by the laminate polishing pad-production method described below, and have completed the invention.

In a first aspect, the invention is directed to a method for production of a laminate polishing pad, including the steps of: preparing a cell-dispersed urethane composition by a mechanical frothing process; ejecting the cell-dispersed urethane composition onto a cushion layer continuously while feeding the cushion layer; curing the cell-dispersed urethane composition while controlling the thickness of the composition evenly to form a polishing layer made of a polyurethane foam, thereby producing a long laminate sheet; and cutting the long laminate sheet.

The production method described above allows continuous production of a laminate polishing pad including a polishing layer and a cushion layer and also allows omission of the step of bonding the polishing layer to the cushion layer so that the number of production steps can be reduced and the laminate polishing pad can be produced with high productivity rate. The laminate polishing pad produced by the production method has the advantage that the polishing layer and the cushion layer can not detached from each other during polishing because the polishing layer and the cushion layer are directly laminated with no double-side tape (pressure-sensitive adhesive layer).

In a second aspect, the invention is directed to a method for production of a laminate polishing pad, including the steps of: preparing a cell-dispersed urethane composition by a mechanical frothing process; producing a cushion layer having a surface that is to be in contact with a polishing layer and has projections; ejecting the cell-dispersed urethane composition onto the cushion layer surface having the projections continuously while feeding the cushion layer; curing the cell-dispersed urethane composition while controlling the thickness of the composition evenly to form a polishing layer made of a polyurethane foam, thereby producing a long laminate sheet; cutting the long laminate sheet; and forming a recessed structure on the surface of the polishing layer such that the recessed structure is located between the projections of the cushion layer surface.

The production method described above allows continuous production of a laminate polishing pad including a polishing layer and a cushion layer and also allows omission of the step of bonding the polishing layer to the cushion layer so that the number of production steps can be reduced and the laminate polishing pad can be produced with high productivity rate. The laminate polishing pad produced by the production method causes no detachment between the polishing layer and the cushion layer and hardly causes groove clogging caused by a slurry, polishing dust or the like. It is considered that when conventional laminate polishing pads are used, groove clogging can occur as described below.

As shown in FIG. 2, conventional laminate polishing pads have a structure in which a polishing layer 8 having a recessed structure 10 on a polishing surface side is placed on a flat cushion layer 9. When a substance to be polished is polished with the laminate polishing pad of the above structure, the recessed structure is significantly deformed to have a narrowed opening by a pressure 13 upon pressing of the polished substance against the polishing surface. As a result, a slurry, polishing dust and the like stay in the recessed structure so that holding and replacing of the slurry cannot be efficiently performed, the polishing speed can be reduced or made unstable, and the planarity and in-plane uniformity of the polished substance can be reduced.

On the other hand, the laminate polishing pad obtained by the production method according to the second aspect of the invention has a specific structure as shown in FIG. 3. Specifically, recesses 12 are formed on the back side of the polishing layer 8, and projections 11 are formed on the front side of the cushion layer 9. The recesses 12 and the projections 11 are engaged (in close contact) with one another, and the recessed structure 10 on the polishing surface side of the polishing layer is formed between the projections of the cushion layer surface. In this specific structure, the pressure 13 from the polished substance can be efficiently absorbed by the deformation of the projections of the cushion layer surface so that the deformation of the opening of the recessed structure on the polishing surface side can be suppressed and the recessed structure can be prevented from being clogged with a slurry, polishing dust and the like. As a result, holding and replacing of a slurry can be efficiently performed so that the polishing speed can be stabilized and the substance to be polished can have improved planarity or in-plane uniformity.

In the laminate polishing pad obtained by the production method of the invention, the polishing layer and the cushion layer are in close contact without any other member, such as a double-side tape (pressure-sensitive adhesive layer), interposed therebetween, so that a slurry can be prevented from intruding into an interface between the polishing layer and the cushion layer during polishing. Even when a slurry intrudes into the interface, the adhesion at the interface is not reduced by the slurry, because of no use of any pressure-sensitive adhesive member such as a double-side tape (pressure-sensitive adhesive layer). Therefore, the detachment between the polishing layer and the cushion layer can be effectively prevented.

In the production method of the invention, the height (H) of each of the projections of the cushion layer surface is preferably adjusted to be from 0.05 to 0.9 times, more preferably from 0.1 to 0.6 times the thickness (h) of the polishing layer. If the height of the projections is less than 0.05 times the thickness of the polishing layer, the amount of deformation of the projections can be insufficient so that the pressure from the substance to be polished cannot be sufficiently absorbed by the deformation of the projections. As a result, the opening of the recessed structure on the polishing surface side can be significantly deformed so that the recessed structure can tend to be clogged with a slurry, polishing dust and the like. If the height of the projections is more than 0.9 times the thickness of the polishing layer, the elastic modulus of the polishing layer can be reduced so that the planarizing performance can tend to decrease. The difference (h–H) between the thickness (h) of the polishing layer and the height (H) of each of the projections of the cushion layer surface is preferably adjusted to be 0.2 mm or more, more preferably 0.4 mm or more.

The width (W) of each of the projections of the cushion layer surface is preferably adjusted to be from 1 to 30 times, more preferably from 3 to 15 times the width ($w_1$) of the recessed structure of the polishing layer surface. If the width of each projection is less than the width of the recessed structure, the pressure from the substance to be polished cannot be sufficiently absorbed by the deformation of the projections. As a result, the opening of the recessed structure on the polishing surface side can be significantly deformed so that the recessed structure can tend to be clogged with a slurry, polishing dust and the like. If the width of each projection is more than 30 times the width of the recessed structure, the elastic modulus of the polishing layer can be reduced so that the planarizing performance can tend to decrease. The difference ($w_2$–W) between the width ($w_2$) of each island portion of the polishing layer and the width (W) of each projection of the cushion layer surface (or the total of the widths of a plurality of projections in a single island portion) is preferably adjusted to be 0.5 mm or more, more preferably 0.75 mm or more.

The invention is also directed to a laminate polishing pad produced by the method described above and to a method for production of a semiconductor device, including the step of polishing the surface of a semiconductor wafer with the laminate polishing pad.

DESCRIPTION OF REFERENCE NUMERAL

Figure 1:
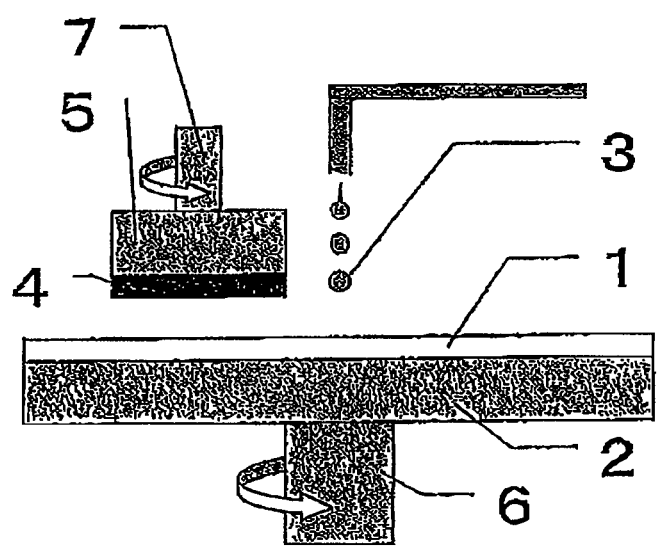
FIG. 1 is a schematic configuration diagram showing an example of a polishing apparatus for use in CMP polishing.
Figure 2:
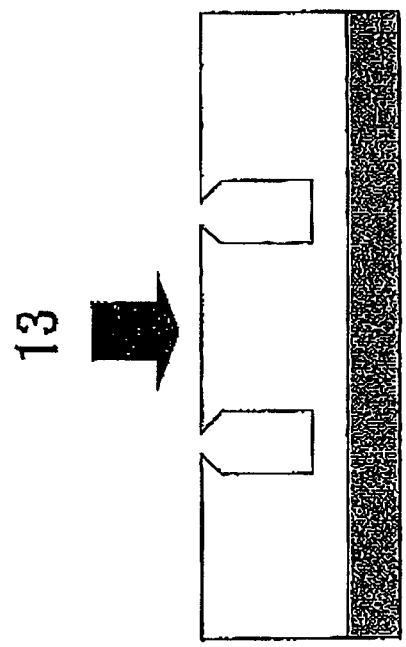
FIG. 2 is a schematic configuration diagram of a conventional laminate polishing pad.
Figure 2:
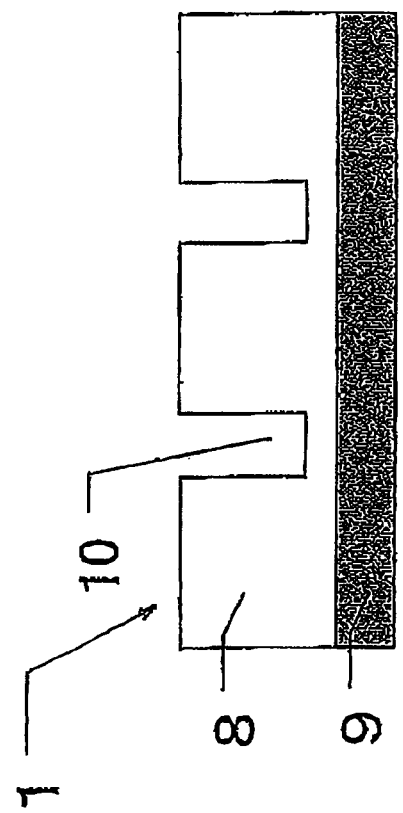
Figure 3:
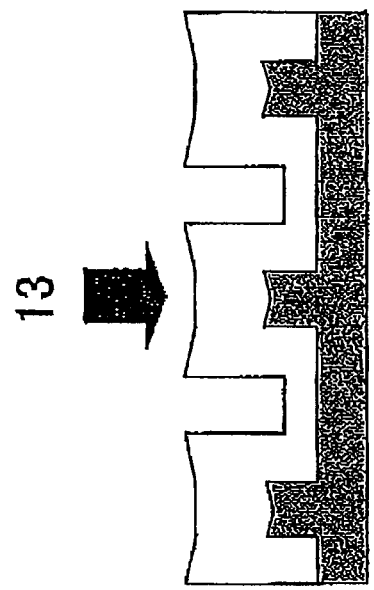
FIG. 3 is a schematic configuration diagram of a laminate polishing pad according to the invention.
Figure 3:
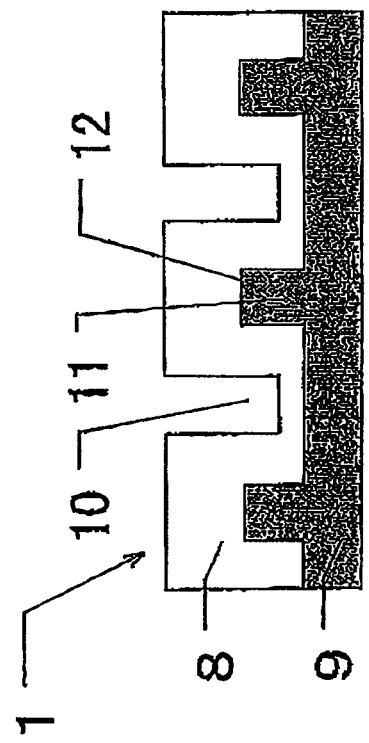

1: Laminate polishing pad
2: Polishing surface plate
3: Abrasive agent (slurry)
4: Substance to be polished (semiconductor wafer)
5: Support (polishing head)
6, 7: Rotary shaft
8: Polishing layer
9: Cushion layer
10: Recessed structure
11: Projection
12: Recess
13: Pressure
14: Cell-dispersed urethane composition
15: Mixing head
16: Conveyor
17: Long laminate sheet
18: Roll
19: Cutting machine
20: Laminate polishing sheet
21: Projection and recess-forming roll
22: Facing material

BEST MODE FOR CARRYING OUT THE INVENTION

In a first aspect of the invention, a method for production of a laminate polishing pad includes the steps of: preparing a cell-dispersed urethane composition by a mechanical frothing process; ejecting the cell-dispersed urethane composition onto a cushion layer continuously while feeding the cushion layer; curing the cell-dispersed urethane composition while controlling the thickness of the composition evenly to form a polishing layer made of a polyurethane foam, thereby producing a long laminate sheet; and cutting the long laminate sheet.

In a second aspect of the invention, a method for production of a laminate polishing pad includes the steps of: preparing a cell-dispersed urethane composition by a mechanical frothing process; producing a cushion layer having a surface that is to be in contact with a polishing layer and has projections; ejecting the cell-dispersed urethane composition onto the cushion layer surface having the projections continuously while feeding the cushion layer; curing the cell-dispersed urethane composition while the thickness of the composition evenly to form a polishing layer made of a polyurethane foam, thereby producing a long laminate sheet; cutting the long laminate sheet; and forming a recessed structure on the surface of the polishing layer such that the recessed structure is located between the projections of the cushion layer surface.

In the invention, the polishing layer is made of a polyurethane foam having fine cells. Polyurethane is a preferred material for forming the polishing layer, because polyurethane is excellent in abrasion resistance and polymers with desired physical properties can be easily obtained by varying the raw material composition.

The polyurethane comprises an isocyanate component, a polyol component (high-molecular-weight polyol, low-molecular-weight polyol etc.) and a chain extender.

As the isocyanate component, a compound known in the field of polyurethane can be used without particular limitation. The isocyanate component includes, for example, aromatic diisocyanates such as 2,4-toluene diisocyanate, 2,6-toluene diisocyanate, 2,2'-diphenyl methane diisocyanate, 2,4'-diphenyl methane diisocyanate, 4,4'-diphenyl methane diisocyanate, 1,5-naphthalene diisocyanate, p-phenylene diisocyanate, m-phenylene diisocyanate, p-xylylene diisocyanate and m-xylylene diisocyanate, aliphatic diisocyanates such as ethylene diisocyanate, 2,2,4-trimethyl hexamethylene diisocyanate and 1,6-hexamethylene diisocyanate, and cycloaliphatic diisocyanates such as 1,4-cyclohexane diisocyanate, 4,4'-dicyclohexyl methane diisocyanate, isophorone diisocyanate and norbornane diisocyanate. These may be used alone or as a mixture of two or more thereof.

As the isocyanate component, it is possible to use not only the above-described diisocyanate compounds but also multifunctional (trifunctional or more) polyisocyanates. As the multifunctional isocyanate compounds, a series of diisocyanate adduct compounds are commercially available as Desmodul-N (Bayer) and Duranate™ (Asahi Chemical Industry Co., Ltd.).

Among the above isocyanate components, aromatic diisocyanate and alicyclic diisocyanate are preferably used in combination, and in particular, toluene diisocyanate and dicyclohexylmethane diisocyanate are preferably used in combination.

As the high-molecular-weight polyol, those usually used in the art of polyurethane can be exemplified. Examples thereof include polyether polyols represented by polytetramethylene ether glycol and polyethylene glycol; polyester polyols represented by polybutylene adipate; polyester polycarbonate polyols exemplified by reaction products of polyester glycol such as polycaprolactone polyol or polycaprolactone and alkylene carbonate; polyester polycarbonate polyols obtained by reacting ethylene carbonate with polyvalent alcohol and the reacting the resultant reaction mixture with an organic dicarboxylic acid; and polycarbonate polyols obtained by ester exchange reaction between polyhydroxyl compound and aryl carbonate. These may be used singly or in combination of two or more kinds.

Number average molecular weight of the high-molecular-weight polyol is not particularly limited, however, from the viewpoint of modulus characteristic of obtainable polyurethane resin it is preferably in the range of 500 to 2000. When the number average molecular weight is less than 500, a polyurethane resin obtained therefrom do not have sufficient modulus characteristic, and is likely to be a brittle polymer. And thus, a polishing pad formed of such polyurethane resin is too hard, and result in occurrence of scratch on surface of an object to be polished. Also it is undesired from the viewpoint of life time of polishing pad because ablation is more likely to occur. On the other hand, number average molecular weight exceeding 2000 is not favorable because a polishing pad formed of a polyurethane resin obtainable therefrom is too soft to obtain sufficiently satisfactory planarity.

Besides the above high-molecular-weight polyol described in the above as a polyol component, it is preferred to concomitantly use a low-molecular-weight polyol such as ethyleneglycol, 1,2-propylene glycol, 1,3-propylene glycol, 1,4-butanediol, 1,6-hexanediol, neopentylglyol, 1,4-cyclohexanedimethanol, 3-methyl-1,5-pentanediol, diethyleneglycol, triethyleneglycol, 1,4-bis(2-hydroxyethoxy)benzene, trimethylolpropane, glycerin, 1,2,6-hexanetriol, pentaerythritol, tetramethylol cyclohexane, methylglucoside, sorbitol, mannitol, dulcitol, sucrose, 2,2,6,6-tetrakis(hydroxymethyl)cyclohexanol, and triethanol amine. Low-molecular-weight polyamine such as ethylenediamine, tolylenediamine, diphenylmethanediamine, and diethylenetriamine may be used. These may be used singly or in combination of two or more kinds. Molecular weight of low-molecular-weight polyol and low-molecular-weight polyamine is less than 500, and preferably 250 or less.

The ratio between the amounts of the high-molecular-weight polyol and the low-molecular-weight polyol in the polyol components may be determined depending on the desired characteristics of the polishing layer to be produced with the polyols.

In the case where a polyurethane foam is produced by means of a prepolymer method, a chain extender is used in curing of a prepolymer. A chain extender is an organic compound having at least two active hydrogen groups and examples of the active hydrogen group include: a hydroxyl group, a primary or secondary amino group, a thiol group (SH) and the like. Concrete examples of the chain extender include: polyamines such as 4,4'-methylenebis(o-chloroaniline) (MOCA), 2,6-dichloro-p-phenylenediamine, 4,4'-methylenebis(2,3-dichloroaniline), 3,5-bis(methylthio)-2,4-toluenediamine, 3,5-bis(methylthio)-2,6-toluenediamine, 3,5-diethyltoluene-2,4-diamine, 3,5-diethyltoluene-2,6-diamine, trimethylene glycol-di-p-aminobenzoate, polytetramethylene oxide-di-p-aminobenzoate, 4,4'-diamino-3,3',5,5'-tetraethyldiphenylmethane, 4,4'-diamino-3,3'-diisopropyl-5,5'-dimethyldiphenylmethane, 4,4'-diamino-3,3',5,5'-tetraisopropyldiphenylmethane, 1,2-bis(2-aminophenylthio)ethane, 4,4'-diamino-3,3'-diethyl-5,5'-dimethyldiphenylmethane, N,N'-di-sec-butyl-4,4'-diaminophenylmethane, 3,3'-diethyl-4,4'-diaminodiphenylmethane, m-xylylenediamine, N,N'-di-sec-butyl-p-phenylenediamine, m-phenylenediamine and p-xylylenediamine; low-molecular-weight polyol component; and a low-molecular-weight polyamine component. The chain extenders described above may be used either alone or in mixture of two kinds or more.

A ratio between an isocyanate component, a polyol component and a chain extender in the invention can be altered in various ways according to molecular weights thereof, desired physical properties of polyurethane foam and the like. In order to obtain polyurethane foam with desired polishing characteristics, a ratio of the number of isocyanate groups in an isocyanate component relative to a total number of active hydrogen groups (hydroxyl groups+amino groups) in a polyol component and a chain extender is preferably in the range of from 0.80 to 1.20 and more preferably in the range of from 0.99 to 1.15. When the number of isocyanate groups is outside the aforementioned range, there is a tendency that curing deficiency is caused, required specific gravity and hardness are not obtained, and polishing property is deteriorated.

Manufacture of a polyurethane foam is enabled by means of either a prepolymer method or a one shot method, of which preferable is a prepolymer method in which an isocyanate-terminated prepolymer is synthesized from an isocyanate component and a polyol component in advance, with which a chain extender is reacted since physical properties of an obtained polyurethane resin is excellent.

Note that an isocyanate-terminated prepolymer with a molecular weight of the order in the range of from 800 to 5000 is preferable because of excellency in workability and physical properties.

The cushion layer compensates for characteristics of the polishing layer. The cushion layer is required for satisfying both planarity and uniformity which are in a tradeoff relationship in CMP. Planarity refers to flatness of a pattern region upon polishing an object of polishing having fine unevenness generated upon pattern formation, and uniformity refers to the uniformity of the whole of an object of polishing. Planarity is improved by the characteristics of the polishing layer, while uniformity is improved by the characteristics of the cushion layer. The cushion layer used in the laminate polishing pad of the present invention is softer than the polishing layer.

The material forming the cushion layer is not particularly limited, and examples of such material include a nonwoven fabric such as a polyester nonwoven fabric, a nylon nonwoven fabric or an acrylic nonwoven fabric, a nonwoven fabric impregnated with resin such as a polyester nonwoven fabric impregnated with polyurethane, polymer resin foam such as polyurethane foam and polyethylene foam, rubber resin such as butadiene rubber and isoprene rubber, and photosensitive resin.

The thickness of the cushion layer is generally, but not limited to, from about 0.5 to 1.5 mm, preferably from 0.5 to 1.0 mm.

When the hardness of the cushion layer is outside the aforementioned range, there is a tendency that the uniformity of the substance to be polished is deteriorated.

Figure 4:
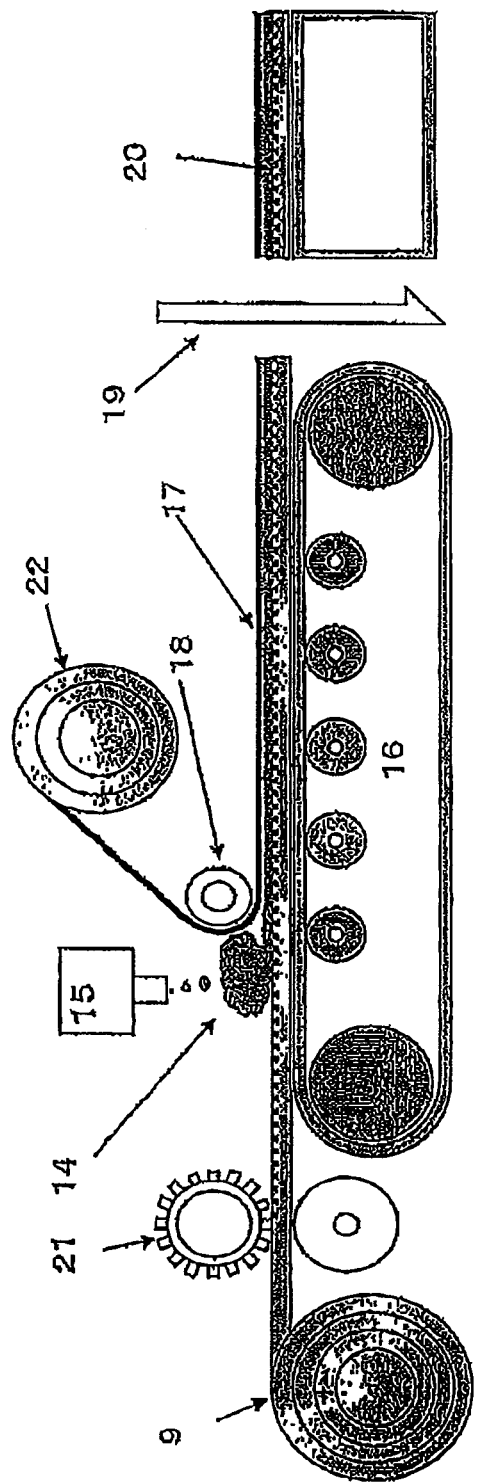
FIG. 4 is a schematic diagram showing a production step of a laminate polishing pad according to the invention.

A description will be given of the method for production of a laminate polishing pad according to the first aspect of the invention. FIG. 4 is a schematic diagram showing a production step of a laminate polishing pad according to the invention.

The cell-dispersed urethane composition 14 is prepared by a mechanical frothing method. The mechanical frothing method is a method wherein starting components are introduced into a mixing chamber 15, while an unreactive gas is mixed therein, and the mixture is mixed under stirring with a mixer such as an Oaks mixer thereby dispersing the unreactive gas in a fine-cell state in the starting mixture. The mechanical frothing method is a preferable method because a density of the polyurethane foam can be easily adjusted by regulating the amount of an unreactive gas mixed therein.

The unreactive gas used for forming fine cells is preferably not combustible, and is specifically nitrogen, oxygen, a carbon dioxide gas, a rare gas such as helium and argon, and a mixed gas thereof, and the air dried to remove water is most preferable in respect of cost.

In preparing the cell-dispersed urethane composition, a silicone surfactant that is a copolymer of polyalkylsiloxane and polyether and has no active hydrogen group is preferably added to the raw material component. Examples of preferred compounds of such a silicone surfactant include SH-190 and SH-192 (manufactured by Dow Corning Toray Co., Ltd.), L-5340 (manufactured by Nippon Unicar Company Limited), and the like. The amount of addition of the silicone surfactant in the polyurethane foam is preferably 0.05% by weight or more and less than 5% by weight. If the amount is less than 0.05% by weight, the foam with fine cells can tend to be difficult to be obtained. If the amount is 5% by weight or more, the foam can contain a too large number of cells so that a high-hardness polyurethane foam can tend to be difficult to be obtained. If necessary, a stabilizing agent such as an antioxidant, a lubricant, a pigment, a filler, an antistatic agent and any other additive may be added.

Known polyurethane-reaction-promoting catalysts may also be used, such as tertiary amine catalysts. The type and the amount of addition of the catalyst may be appropriately chosen depending on the flow time after the ejection of the cell-dispersed urethane composition onto the cushion layer.

While a cushion layer 9 travels on a conveyor 16, the cell-dispersed urethane composition 14 is continuously ejected from an ejection nozzle of the mixing head 15 onto the cushion layer 9. The travel speed of the cushion layer 9 and the amount of ejection of the cell-dispersed urethane composition 14 may be appropriately controlled depending on the thickness of the polishing layer.

The cell-dispersed urethane composition is then cured while controlling the thickness evenly to form a polishing layer made of a polyurethane foam, so that a long laminate sheet 17 is produced. For example, a roll 18 such as a nip roll or a coater roll, a doctor blade or the like may be used as means for controlling the thickness evenly. A facing material 22 may also be used when the thickness is evenly controlled. For example, the cell-dispersed urethane composition may be cured by allowing it to pass through a heating oven placed above the conveyor, after the thickness is evenly controlled. The heating temperature may be from about 40 to 100° C., and the heating time may be about 5 to 10 minutes. The cell-dispersed urethane composition may be allowed to react until it does not flow, and then heated and subjected to post curing. Such a process is effective in improving the physical characteristics of the polyurethane foam.

The polyurethane foam preferably has an average cell diameter of 30 to 80 µm, more preferably 30 to 60 µm. If the cell diameter is without the range, the polishing speed can tend to be low, or the planarity (flatness) of the polished substance (wafer) can tend to be low.

The resulting long laminate sheet 17 is cut into laminate polishing sheets 20 each with a specific form by means of a cutting machine 19. The laminate polishing sheet 20 is then subjected to several processes, resulting in a laminate polishing pad 1.

The thickness of the polishing layer is generally, but not limited to, from about 0.8 to 4 mm, preferably from 1.2 to 2.5 mm.

Preferably, the polishing layer has a specific gravity ranging from 0.5 to 1.0. When the specific gravity is less than 0.5, the surface strength of the polishing layer decreases, so that the planarity of the polished substance tends to decrease. When the specific gravity is larger than 1.0, the fine cell number on the surface of the polishing layer decreases, so that the polishing rate tends to decrease despite excellent planarity.

Preferably, the polishing layer has a hardness measured by ASKER D hardness meter, ranging from 45 to 65 degrees. When the ASKER D hardness is less than 45 degrees, the planarity of the polished substance decreases, while when the hardness is more than 65 degrees, the uniformity of the polished substance tends to decrease despite excellent planarity.

The range of the thickness of the polishing layer is preferably 100 µm or less. When the range of the thickness is higher than 100 µm, large undulation is caused to generate portions different in a contacting state with an object of polishing, thus adversely influencing polishing characteristics. To solve the range of the thickness of the polishing layer, the surface of the polishing layer is dressed generally in an initial stage of polishing by a dresser having abrasive grains of diamond deposited or fused thereon, but the polishing layer outside of the range described above requires a longer dressing time to reduce the efficiency of production.

The method for reducing range of the thickness of the polishing layer may include buffing the surface of the long laminate sheet 17 with a buffing machine. Alternatively, after the long laminate sheet 17 is cut into pieces, the surface of each resulting laminate polishing sheet 20 may be buffed such that range of the thickness of the polishing layer can be reduced. The buffing is preferably performed in a stepwise manner with abrasive materials different in particle size.

In the first aspect of the invention, the polishing surface of the laminate polishing pad, which is brought into contact with a substance to be polished, preferably has projections and recesses for holding and replacing a slurry. The polishing surface of the polishing layer made of a foam has a lot of openings which function to hold and replace a slurry. If projections and recesses are formed on the polishing surface, a slurry can be more efficiently held and replaced so that the destruction of the substance to be polished caused by adsorption of the slurry on the substance can be prevented. The projections and recesses may be not limited, as long as they can serve to hold and replace a slurry. For example, examples of forms of the projections and recesses include XY lattice grooves, concentric grooves, through holes, non-through holes, polygonal columns, cylindrical columns, spiral grooves, eccentric grooves, radial grooves, or any combination thereof. In general, the projections and recesses are regularly formed. However, the groove pitch, the groove width, the groove depth, and the like may be changed per every certain range in order to hold and replace a slurry in a desired manner.

The method of forming the projection and recess structure is not particularly limited, and for example, formation by mechanical cutting with a jig such as a bite of predetermined size, formation by casting and curing resin in a mold having a specific surface shape, formation by pressing resin with a pressing plate having a specific surface shape, formation by photolithography, formation by a printing means, and formation by a laser light using a $CO_2$ gas laser or the like.

A description will be given of the method for production of a laminate polishing pad according to the second aspect of the invention. The method according to the second aspect of the invention is basically the same as the method for production of a laminate polishing pad according to the first aspect of the invention but different in that: (1) the long cushion layer used has a surface that is to be in contact with a polishing layer and has projections, and the cell-dispersed urethane composition is ejected onto the cushion layer surface having the projections; and (2) a recessed structure is formed on the surface of the polishing layer so as to be located between the projections of the cushion layer surface.

For example, the long cushion layer having a surface that is to be in contact with a polishing layer and has projections may be formed by (1) a method including mechanically grinding the surface of a long sheet-like cushion layer with a tool such as a byte to form projections; (2) a method including heat-pressing the surface of a long sheet-like cushion layer with a press plate having a specifically-like surface; (3) a method including forming projections by photolithography or printing; or (4) a method including forming projections by application of laser beams such as carbon dioxide laser beams. Alternatively, the projections may be continuously formed using a projection and recess-forming roll 21 as shown in FIG. 4, before the cell-dispersed urethane composition 14 is ejected.

Figure 5:
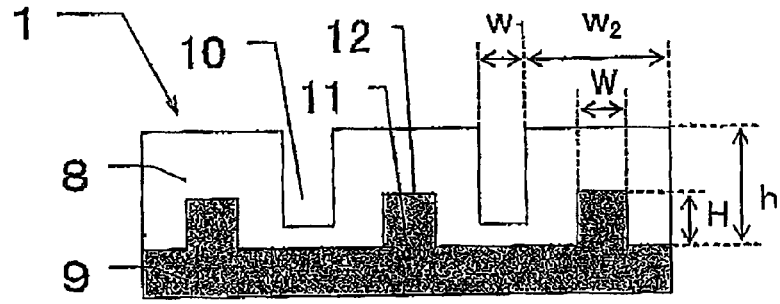
FIG. 5 is a schematic configuration diagram of another laminate polishing pad according to the invention.
Figure 6:
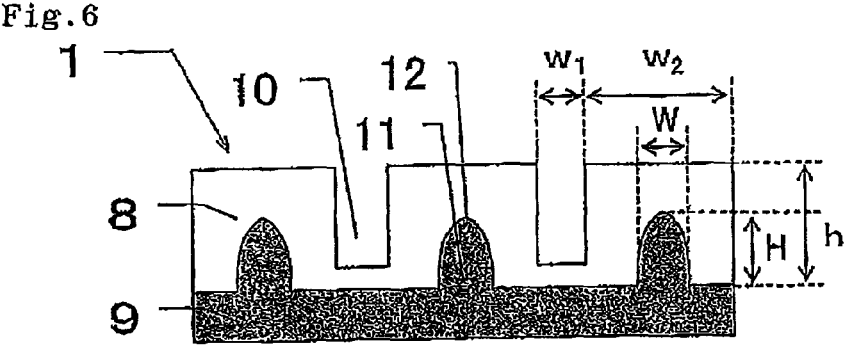
FIG. 6 is a schematic configuration diagram of a further laminate polishing pad according to the invention.
Figure 7:
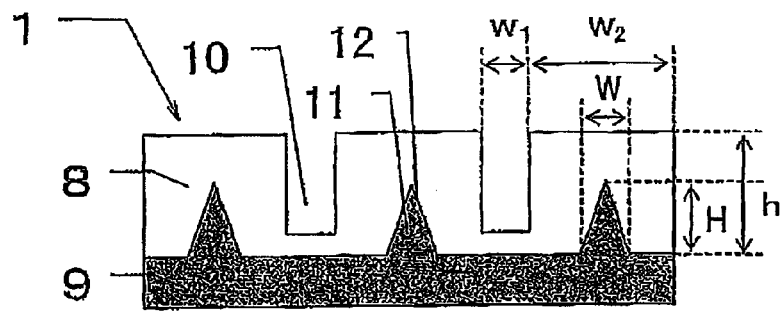
FIG. 7 is a schematic configuration diagram of a further laminate polishing pad according to the invention.
Figure 8:
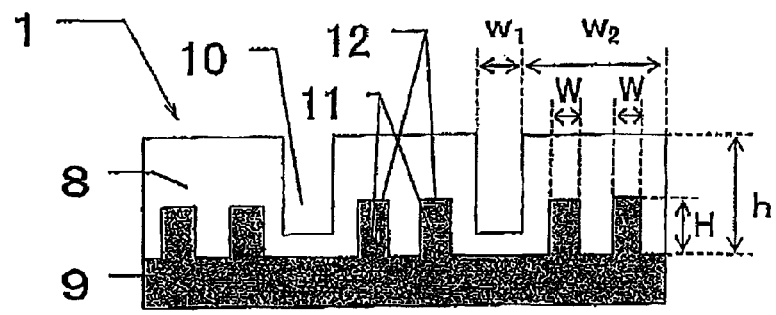
FIG. 8 is a schematic configuration diagram of a further laminate polishing pad according to the invention.

Examples of the form of the projections include, but are not limited to, a rectangle as shown in FIG. 5, an arc as shown in FIG. 6, and a triangle as shown in FIG. 7. As shown in FIG. 8, the surface of the cushion layer may have two or more projections between the adjacent recesses of the polishing layer surface (in a single island portion).

The thickness of the cushion layer (exclusive of the projections) is preferably from 0.5 to 1.5 mm, more preferably from 0.5 to 1 mm.

For example, the recessed structure may be formed on the polishing layer surface so as to be located between the projections of the cushion layer surface by a method that includes: continuously ejecting the cell-dispersed urethane composition onto the cushion layer surface having projections; controlling the thickness of the composition evenly and then pressing the composition with a press plate having a specifically-like surface (for forming the recessed structure on the polishing surface); and heating the composition to cure it by a reaction. In the pressing process, the press plate should be aligned such that the recessed structure on the polishing layer surface can be formed between the projections of the cushion layer surface.

Alternatively, the recessed structure may be formed on the polishing layer surface after the cell-dispersed urethane composition is cured to form the polishing layer. Examples of the method for forming the recessed structure include, but are not limited to, a method of performing mechanical grinding with a byte or any other tool of a specific size, a method of forming it by photolithography, a method of forming it by a printing method, and a method of forming it with a laser beam such as a carbon dioxide laser beam.

A laminate polishing pad of the invention may be provided with a double sided tape on the surface of the pad adhered to a platen. As the double sided tape, a tape of a common construction can be used in which adhesive layers are, as described above, provided on both surfaces of a substrate. As the substrate, for example, a nonwoven fabric or a film is used. Preferably used is a film as a substrate since separation from the platen is necessary after the use of a laminate polishing pad. As a composition of an adhesive layer, for example, a rubber-based adhesive or an acrylic-based adhesive is exemplified. Preferable is an acrylic-based adhesive because of less of metal ions in content to which consideration is given.

A semiconductor device is fabricated after operation in a step of polishing a surface of a semiconductor wafer with a laminate polishing pad. The term, a semiconductor wafer, generally means a silicon wafer on which a wiring metal and an oxide layer are stacked. No specific limitation is imposed on a polishing method of a semiconductor wafer or a polishing apparatus, and polishing is performed with a polishing apparatus equipped, as shown in FIG. 1, with a polishing platen 2 supporting a laminate polishing pad 1, a polishing head 5 holding a semiconductor wafer 4, a backing material for applying a uniform pressure against the wafer and a supply mechanism of a polishing agent 3. The laminate polishing pad 1 is mounted on the polishing platen 2 by adhering the pad to the platen with a double sided tape. The polishing platen 2 and the polishing head 5 are disposed so that the laminate polishing pad 1 and the semiconductor wafer 4 supported or held by them oppositely face each other and provided with respective rotary shafts 6 and 7. A pressure mechanism for pressing the semiconductor wafer 4 to the laminate polishing pad 1 is installed on the polishing head 5 side. During polishing, the semiconductor wafer 4 is polished by being pressed against the laminate polishing pad 1 while the polishing platen 2 and the polishing head 5 are rotated and a slurry is fed. No specific limitation is placed on a flow rate of the slurry, a polishing load, a polishing platen rotation number and a wafer rotation number, which are properly adjusted.

Protrusions on the surface of the semiconductor wafer 4 are thereby removed and polished flatly. Thereafter, a semiconductor device is produced therefrom through dicing, bonding, packaging etc. The semiconductor device is used in an arithmetic processor, a memory etc.

EXAMPLES

Description will be given of the invention with examples, while the invention is not limited to description in the examples.
[Methods for Measurement and Evaluation]
(Measurement of Number Average Molecular Weight)

The number average molecular weight was measured as a polystyrene-equivalent value by GPC (gel permeation chromatography) with standard polystyrene.
GPC system: LC-10A manufactured by Shimadzu Corporation
Columns: three columns PLgel (5 μm, 500 Å), PLgel (5 μm, 100 Å) and PLgel (5 μm, 50 Å) each manufactured by Polymer Laboratories were coupled and used.
Flow rate: 1.0 ml/minute
Concentration: 1.0 g/l
Injection volume: 40 μl
Column temperature: 40° C.
Eluent: tetrahydrofuran (Measurement of Average Cell Diameter)

A polishing layer cut parallel to be as thin as about 1 mm by a microtome cutter was used as a sample for measurement of average cell diameter. The sample was fixed on a slide glass, and the diameters of all cells in an arbitrary region of 0.2 mm×0.2 mm were determined by an image processor (Image Analyzer V10, manufactured by Toyobouseki Co., Ltd), to calculate the average cell diameter.

(Measurement of Specific Gravity)

Determined according to JIS Z8807-1976. A polishing lay cut out in the form of a strip of 4 cm×8.5 cm (thickness: arbitrary) was used as a sample for measurement of specific gravity and left for 16 hours in an environment of a temperature of 23±2° C. and a humidity of 50%±5%. Measurement was conducted by using a specific gravity hydrometer (manufactured by Sartorius Co., Ltd).

(Measurement of Asker D Hardness)

Measurement is conducted according to JIS K6253-1997. A polishing layer cut out in a size of 2 cm×2 cm (thickness: arbitrary) was used as a sample for measurement of hardness and left for 16 hours in an environment of a temperature of 23±2° C. and a humidity of 50%±5%. At the time of measurement, samples were stuck on one another to a thickness of 6 mm or more. A hardness meter (Asker D hardness meter, manufactured by Kobunshi Keiki Co., Ltd.) was used to measure hardness.

(Measurement of Asker (A) Hardness)

Measurement is conducted according to JIS K6253-1997. A cushion layer cut out in a size of 2 cm×2 cm (thickness: arbitrary) was used as a sample for measurement of hardness and left for 16 hours in an environment of a temperature of 23±2° C. and a humidity of 50%±5%. At the time of measurement, samples were stuck on one another to a thickness of 6 mm or more. A hardness meter (Asker (A) hardness meter, manufactured by Kobunshi Keiki Co., Ltd.) was used to measure hardness.

(Evaluation of Polishing Characteristics)

Using SPP600S (manufactured by Okamoto Machine Tool Works, Ltd.) as a polishing apparatus, and using a prepared laminate polishing pad, a polishing rate was assessed. A thermally oxidized membrane of 1 µm was made on a silicon wafer of 8 inch, one of the membrane was polished above 0.5 µm, and an initial polishing rate was calculated from a time thereupon. For measuring a thickness of an oxidized membrane, an interference film thickness measuring instrument (manufactured by Otsuka Electronics Co., Ltd.) was used. During polishing, silica slurry (SS12 manufactured by Cabot) was added at a flow rate of 150 ml/min. Polishing loading was 350 g/cm$^2$, the number of revolutions of the polishing platen was 35 rpm, and the number of revolutions of the wafer was 30 rpm.

For assessing planarity, a thermally oxidized membrane was deposited 0.5 µm on an 8 inch silicon wafer, patterning of L/S (line and space)=25 µm/5 µm and L/S=5 µm/25 µm was performed, and an oxidized membrane (TEOS) was further deposited 1 µm to prepare a wafer with a pattern at an initial step of 0.5 µm. This wafer was polished under the aforementioned polishing condition, and an abrasion amount of a bottom part of a 25 µm space was measured at a global step of 2000 Å or smaller, thereby, planarity was assessed. As a value of an abrasion amount is smaller, planarity can be said to be excellent.

Figure 9:
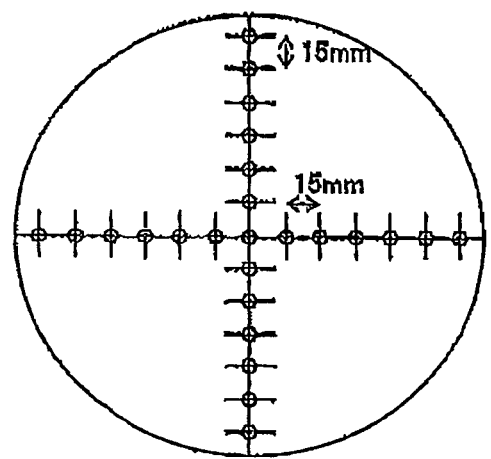
FIG. 9 is a schematic diagram showing 25 points on a wafer used in thickness measurement.

Evaluation of in-plane uniformity was carried out in the following manner. Using an 8-inch silicon wafer on which 1 µm of a thermally oxidized membrane was deposited, polishing was conducted under the aforementioned polishing conditions for 2 minutes, and from measurements of membrane thickness before and after polishing at 25 specified positions on the wafer as shown in FIG. 9, maximum polishing rate and minimum polishing rate were determined. These maximum and minimum rates were assigned to the formula below to determine in-plane uniformity. The smaller the value of the in-plane uniformity, the better the in-plane uniformity is.

In-plane uniformity(%)={(maximum polishing rate−minimum polishing rate)/(maximum polishing rate+minimum polishing rate)}×100

(Evaluation of Groove Clogging of Polishing Layer)

The total polishing time was recorded, when the polishing speed reached 2000 Å/minute or less.

(Evaluation of Detachment in Laminate Polishing Pad)

After polishing for 600 minutes in total, the state of the lamination state of the polishing layer and the cushion layer was visually observed and evaluated according to the following criteria:

◯: There was no detachment.

x: Detachment was observed at the end of the polishing pad.

Example 1

A mixture of 32 parts by weight of toluene diisocyanate (a mixture of 2,4-diisocyanate/2,6-diisocyanate=80/20), 8 parts by weight of 4,4'-dicyclohexylmethane diisocyanate, 54 parts by weight of polytetramethylene glycol (1006 in number average molecular weight), and 6 parts by weight of diethylene glycol was prepared and stirred and heated at 80° C. for 120 minutes so that an isocyanate-terminated prepolymer (2.1 meq/g in isocyanate equivalent) was prepared. One hundred parts by weight of the isocyanate-terminated prepolymer and 3 parts by weight of a silicone surfactant (SH-192 manufactured by Dow Corning Toray Co., Ltd.) were mixed and controlled to have a temperature 80° C. so that a mixture A was prepared. In a mixing chamber, 80 parts by weight of the mixture A and 20 parts by weigh of 4,4'-methylenebis(o-chloroaniline) (Iharacuamine MT manufactured by Ihara Chemical Industry Co., Ltd.) melted at 120° C. were mixed. At the same time, air was mixed into the resulting mixture by mechanical stirring so that a cell-dispersed urethane composition was prepared.

While a cushion layer made of a polyethylene foam (Toraypef manufactured by Toray Industries, Inc.) with its surface buffed and its thickness controlled to 0.8 mm was fed, the cell-dispersed urethane composition was continuously ejected onto the surface of the cushion layer. The cell-dispersed urethane composition was then covered with a facing material, and its thickness was controlled evenly using a nip roll. The composition was then cured by heating at 80° C. to form a polishing layer made of a polyurethane foam so that a long laminate sheet was prepared. The resulting long laminate sheet was cut into appropriate size pieces, which were subjected to post curing at 80° C. for 6 hours to give laminate polishing sheets. The polishing layer surface of each resulting laminate polishing sheet was grooved using a grooving machine (manufactured by Toho Koki Co., Ltd.) so that a laminate polishing pad was produced.

Example 2

While a cushion layer made of a polyethylene foam (Toraypef manufactured by Toray Industries, Inc.) with its surface buffed and its thickness controlled to 1.7 mm was fed, a projection and recess-forming roll being heated at 90° C. and rotated was pressed against the cushion layer surface so that projections (H: 0.13 mm, W: 8 mm) were formed at regular intervals on the surface of the cushion layer. The cell-dispersed urethane composition prepared in Example 1 was continuously ejected onto the surface of the cushion layer. Laminate polishing sheets were then prepared using the process of Example 1. The polishing layer surface of each resulting laminate polishing sheet was grooved using a grooving machine (manufactured by Toho Koki Co., Ltd.) such that each groove was located between the adjacent projections of the cushion layer surface, so that a laminate polishing pad (h: 1.3 mm, $w_1$: 2 mm, $w_2$: 12 mm) was produced.

Comparative Example 1

The cell-dispersed urethane composition prepared in Example 1 was poured into a bread-shaped open mold. When the composition lost fluidity, the composition in the mold was placed into an oven and subjected to post curing at 80° C. for 6 hours so that a polyurethane resin foam block was obtained. The polyurethane resin foam block was sliced into polyurethane resin foam sheets with a hand saw-type slicer (manufactured by Fecken). The surface of each resulting sheet was buffed with a buffing machine (manufactured by Amitec Corporation) such that the sheet had a specific thickness. As a result, the thickness accuracy of the sheet was controlled (1.3 mm in sheet thickness). A piece with a specific diameter (61 cm) was punched out from the buffed sheet, and the surface of the resulting sheet was grooved using a grooving machine (manufactured by Toho Koki Co., Ltd.) so that a polishing layer was formed. The back side of the polishing layer was bonded to a commercially-available polyurethane-impregnated nonwoven fabric cushion layer with a double-side tape so that a laminate polishing pad was produced.

Polishing tests were performed using the laminate polishing pads obtained in Examples 1 and 2 and Comparative Example 1 to evaluate polishing performance. The results are shown in Table 1.

TABLE 1

|  | Example 1 | Example 2 | Comparative Example 1 |
| --- | --- | --- | --- |
| Lamination Method | Integration | Integration | Double-Side Tape |
| Recessed Structure on Polishing Surface Side | XY Grooves | XY Grooves | XY Grooves |
| Polishing Layer Thickness (h) | 1.3 | 1.3 | 1.3 |
| Width ($w_2$) of Island Portion of Polishing Layer | 12 | 12 | 12 |
| Width ($w_1$) of Groove of Polishing Surface | 2 | 2 | 2 |
| Form of Projections of Cushion Layer Surface | — | Rectangle | — |
| Height (H) of Projections of Cushion Layer Surface | — | 0.13 | — |
| Width (W) of Projections of Cushion Layer Surface | — | 8 | — |
| H/h | — | 0.1 | — |
| h − H | — | 1.17 | — |
| W/$w_1$ | — | 4 | — |
| $w_2$ − W | — | 4 | — |
| Average Cell Diameter(μm) | 53 | 53 | 53 |
| Specific Gravity of Polishing Layer | 0.86 | 0.87 | 0.87 |
| D Hardness of Polishing Layer | 52 | 53 | 54 |
| A Hardness of Cushion Layer | 36 | 36 | 56 |
| Initial Polishing Speed (Å/minute) | 2250 | 2230 | 2300 |
| Planarity (Å) | 2650 | 2300 | 2750 |
| In-Plane Uniformity (%) | 9 | 7 | 10 |
| Evaluation of Groove Clogging (minutes) | 1000 or more | 1000 or more | 1000 or more |
| Evaluation of Detachment | ◯ | ◯ | x |

The results of Table 1 indicate that the laminate polishing pad of the invention causes no detachment between the polishing layer and the cushion layer and hardly causes the groove clogging caused by a slurry, polishing dust or the like for a long time.

The invention claimed is:

1. A method for production of a laminate polishing pad, comprising the steps of:
   preparing a cell-dispersed urethane composition by a mechanical frothing process;
   producing a cushion layer having a surface that is to be in contact with a polishing layer and has projections;
   ejecting the cell-dispersed urethane composition onto the cushion layer surface having the projections continuously while feeding the cushion layer;
   curing the cell-dispersed urethane composition ejected onto the cushion layer, while controlling the thickness of the composition evenly to form a polishing layer made of a polyurethane foam, thereby producing a long laminate sheet;
   cutting the long laminate sheet; and
   forming a recessed structure on a surface of the polishing layer such that the recessed structure is located between the projections of the cushion layer surface and that a width of the recessed structure is different from a distance between two adjacent projections.

2. The method according to claim 1, wherein the height (H) of each of the projections of the cushion layer surface is adjusted to be from 0.05 to 0.9 times the thickness (h) of the polishing layer.

3. The method according to claim 1, wherein the difference (h-H) between the thickness (h) of the polishing layer and the height (H) of each of the projections of the cushion layer surface is adjusted to be 0.2 mm or more.

4. The method according to claim 1, wherein the width (W) of each of the projections of the cushion layer surface is adjusted to be from 1 to 30 times the width ($w_1$) of the recessed structure of the polishing surface.

5. The method according to claim 1, wherein the difference ($w_2$-W) between the width ($w_2$) of each island portion of the polishing layer and the width (W) of each of the projections of the cushion layer surface is adjusted to be 0.5 mm or more.

* * * * *